(12) United States Patent
Shang et al.

(10) Patent No.: US 8,189,534 B2
(45) Date of Patent: May 29, 2012

(54) BASE STATION SYSTEM AND METHOD FOR CALL SETTING UP, HANDING OVER AND RELEASING IN HYBRID NETWORK

(75) Inventors: Qunfeng Shang, Shanghai (CN); Xiaowen Zhang, Shanghai (CN); Yi Liu, Shanghai (CN); Zhangyi Chen, Shanghai (CN); Hai Peng, Shanghai (CN)

(73) Assignee: Alcatel Lucent, Paris (FR)

( * ) Notice: Subject to any disclaimer, the term of this patent is extended or adjusted under 35 U.S.C. 154(b) by 624 days.

(21) Appl. No.: 12/305,581

(22) PCT Filed: Jun. 1, 2007

(86) PCT No.: PCT/CN2007/001762
§ 371 (c)(1),
(2), (4) Date: Jul. 13, 2009

(87) PCT Pub. No.: WO2008/000138
PCT Pub. Date: Jan. 3, 2008

(65) Prior Publication Data
US 2009/0305703 A1    Dec. 10, 2009

(30) Foreign Application Priority Data
Jun. 19, 2006  (CN) .......................... 2006 1 0027797

(51) Int. Cl.
*H04W 4/00* (2009.01)
(52) U.S. Cl. ....................................................... 370/331
(58) Field of Classification Search ................... 370/331
See application file for complete search history.

(56) References Cited

U.S. PATENT DOCUMENTS
6,996,092 B1    2/2006  Maguire et al.

FOREIGN PATENT DOCUMENTS
| CN | 1422484 A | 6/2003 |
|---|---|---|
| CN | 1549627 A | 11/2004 |
| WO | WO 02103919 A2 * | 12/2002 |
| WO | WO 03/005744 A1 | 1/2003 |

OTHER PUBLICATIONS
International Search Report.
* cited by examiner

*Primary Examiner* — Kenny Lin
(74) *Attorney, Agent, or Firm* — Fay Sharpe LLP

(57) ABSTRACT

A base station system and method for call setting up, handing over and releasing in hybrid network are disclosed. The base station system consists of BSC, TC, several BTSs and a band-width guaranteed IP (Internet Protocol) network among them, IP mode transport and traditional TDM mode transport between BSC and TC are simultaneity supported in the system, and BTS supports TDM mode or IP mode. The invention is provided with such advantages: compatibility with TDM, which maximally protects the providers' investment; smooth transition from TDM to IP, which decreases investing risk; flexible choice for different physical layer or data link layer transmission apparatuses to bear IP message, which facilitates the providers to constitute their networks. In IP mode, data service can share bandwidth with the mute frames of voice service, the system can coexist with different IP networks such as 3G or WiMax, and the control plane and the user plane is independent each other so as to simplify the developing procedure and reduce the maintaining cost.

5 Claims, 9 Drawing Sheets

BASE STATION SYSTEM AND METHOD FOR CALL SETTING UP, HANDING OVER AND RELEASING IN HYBRID NETWORK

FIELD OF THE INVENTION

The present invention relates to a base station system (BSS) which supports both IP and traditional TDM, and a method for call setting up, handing over and releasing in a hybrid network.

BACKGROUND OF THE INVENTION

Referring to FIG. 1, a traditional BBS (base station subsystem) consists of a base transceiver station (BTS), a base station controller (BSC), a packet service server (MFS), and a TC (transcoder). It is externally connected to a mobile switching center (MSC) through the TC and wirelessly to a mobile terminal (MS) through the BTS. Within this system, transmissions are all based on a TDM (time division multiplexing) mode, and there is no distinction between a control plane and a user plane. For the BSC, its external interfaces involve ABIS interfaces from the BTS and Ater interfaces from the TC; for the TC, its external interfaces involve A interfaces with the MSC.

Compared with the traditional TDM network outlined above, IP networks are already well developed and need a low cost for operation maintenance. Therefore, it is an inevitable trend in the telecommunication industry that various transmission networks merge into IP networks.

However, how to cope with issues, such as BTS management in different transmission modes, call handover between BTSs operating in different operation modes or the like in the course of TDM networks merging into IP networks, has been a research task to which this industry and the applicant are denoted.

SUMMARY OF THE INVENTION

The present invention is intended to provide a base station system which supports both IP and traditional TDM, and a method for call setting up, handing over and releasing in a hybrid network.

According to a first aspect of the present invention, there is provided a base station controller. The base station controller is connected between several BTSs and a TC under TDM mode, IP/TDM hybrid mode and IP mode, respectively, characterized by comprising an IP/TDM mode call link controller based on a base station controller body, a first signaling interface controller and a second signaling interface controller each being connected with the IP/TDM mode call link controller, and an IP package forwarding unit. Among them, the IP/TDM mode call link controller is used for processing setup, handover and releasing of voice and data call links during IP transmission or IP/TDM hybrid transmission; the first signaling interface controller is used for processing signaling transmission with the TC, controlling setup and releasing of switch links between voice channels at Ater interfaces and voice channels at A interfaces inside the TC; the second signaling interface controller is used for processing signaling and voice transmission with the BTSs in IP, TDM or IP/TDM hybrid mode, and controlling setup and releasing of voice channels between the BTSs and the TC in IP mode or IP/TDM hybrid mode; the IP package forwarding unit is responsible for forwarding IP packages.

The above-described base station controller further comprises an M2UA located inside a signaling No. 7 link controller of the base station controller body and for supporting full IP transmission within the system and assuming signaling access of SS7 between the BSC and the TC.

According to a second aspect of the present invention, there is provided a transcoder. The transcoder is used in cooperation with the base station controller, characterized by comprising a channel transform unit and an IP voice/data frame receiving/sending unit based on a transcoder body, as well as a signaling No. 7 TDM/IP transform unit connected with the channel transform unit. Among them, the channel transform unit is used for accepting control signals from the first signaling interface controller of the base station controller and processing link switch between various channels at A interfaces and Ater interfaces under IP, TDM or IP/TDM mode; the IP voice/data frame receiving/sending unit is used for accepting control signals from the first signaling interface controller of the base station controller and packing, unpacking, receiving and sending of voice frames under IP transmission mode between the TC and the BTSs; the signaling No. 7 TDM/IP transform unit is used for processing the switch of signaling No. 7 between TDM transmission mode and IP transmission mode.

According to a third aspect of the present invention, there is provided a base transceiver station supporting IP transmission. The base transceiver station supporting IP transmission comprises a BTS body, characterized by further comprising an IP mode call processing unit based on the BTS body, an IP voice/data frame receiving/sending unit, as well as an Ethernet physical interface connected with both the IP voice/data frame receiving/sending unit and the IP mode call processing unit. Among them, the IP mode call processing unit is used for processing setup, handover and releasing of voice call links, under the control of the second signaling interface controller of the BSC; the IP voice/data frame receiving/sending unit is used for packing, unpacking, receiving and sending of voice frames in IP transmission mode between the TC and the present BTS.

According to a fourth aspect of the present invention there is provided a base transceiver station supporting IP transmission. The base transceiver station supporting IP transmission comprises a BTS body, characterized by further comprising an IP mode call processing unit based on the BTS body, an IP voice/data frame receiving/sending unit, as well as an E1-based IP transport protocol processing unit connected with each of the IP voice/data frame receiving/sending unit, the IP mode call processing unit and an E1 physical interface on the BTS body. Among them, the IP mode call processing unit is used for processing setup, handover and releasing of voice call links, under the control of the second signaling interface controller of the BSC; the IP voice/data frame receiving/sending unit is used for packing, unpacking, receiving and sending of voice frames in IP transmission mode between the TC and the present BTS; the E1-based IP transport protocol processing unit is used for transmitting IP packages between the BTS and the BSC where E1 serves as a physical transmission medium.

According to a fifth aspect of the present invention, there is provided a base station system in a hybrid network. The base station system comprises the above-described BSC, the above-described TC connected with the BSC, and several BTSs, wherein it further comprises a bandwidth guaranteed IP network provided among the BSC, TC and BTSs, and IP mode transmission and traditional TDM mode transmission between the BSC and the TC being simultaneously supported in the system, and wherein the BTSs are either BTSs supporting TDM transmission or BTSs supporting IP transmission.

In the above-described base station system in a hybrid network, a TCSL protocol mode is employed for switch link control signaling transmission between the TC and the BSC during IP mode transmission, to set up traditional TDM transmission at Ater interface in a hybrid network.

In the above-described base station system in a hybrid network, a UDP-based D channel link access protocol mode is employed for signaling transmission between the BSC and the BTS during IP mode transmission.

In the above-described base station system in a hybrid network, an M2UA protocol mode is employed for signaling No. 7 transmission between the TC and the BSC.

In the above-described base station system in a hybrid network, a UDP-based TRAUP protocol mode is employed for user plane transmission between the TC and the BTC during IP mode transmission.

According to a sixth aspect of the present invention, there is provided a method of call setup by a base station system in a hybrid network during TDM mode-based transmission. The method comprises the following steps: upon receipt of a call setup request from an MSC, a TC transforms signaling No. 7 transmitted on the TDM mode basis into signaling No. 7 transmitted on the IP mode basis and subsequently forwards signaling No. 7 transmitted on the IP mode basis to a BSC; upon receipt of a call setup request from the TC, the BSC allocates wireless resources, checks a call type, determines the mobile terminal to be located at a TDM-BTS, sends a TC switch link setup request to the TC, sets up a switch link inside the BSC, and sends a wireless channel allocation request to the BTS; the system's voice channel for TDM mode-based transmission is activated, whereby an uplink and a downlink are set up.

According to a seventh aspect of the present invention, there is provided a method of call setup by a base station system in a hybrid network during IP mode-based transmission. The method comprises the following steps: upon receipt of a call setup request from an MSC, a TC transforms signaling No. 7 transmitted on the TDM mode basis into signaling No. 7 transmitted on the IP mode basis and subsequently forwards signaling No. 7 transmitted on the IP mode basis to a BSC; upon receipt of a call setup request from the TC, the BSC allocates wireless resources, checks a call type, determines the mobile terminal to be located at an IP-BTS, and sends a wireless channel allocation request to a BTS; the BTS sends a voice channel connection setup request to the TC; the system's voice channel for IP mode-based transmission is activated, whereby an uplink and a downlink are set up.

According to an eighth aspect of the present invention, there is provided a method of call handover from TDM-BTS to IP-BTS for a mobile terminal by a base station system in a hybrid network. The method comprises the following steps: I) during the procedure of a call transmitted on the TDM mode basis, a BSC will receive a call handover request triggered by an MSC or inside the BSC; in case of an MSC-triggered call handover request, upon receipt of the call handover request from the MSC, a TC transforms signaling No. 7 transmitted on the TDM mode basis into signaling No. 7 transmitted on the IP mode basis and subsequently forwards signaling No. 7 transmitted on the IP mode basis to the BSC; the flow then goes to step II); in case of a call handover request triggered inside the BSC, the flow directly goes to step II); II) upon receipt of an internal or external call handover request, the BSC allocates wireless resources, checks a call type, determines the mobile terminal to be located at the TDM-BTS, and sends a wireless channel allocation request to the IP-BTS; III) the IP-BTS sends a voice channel connection setup request to the TC; IV) the system's voice channel for IP mode-based transmission is activated, whereby an uplink and a downlink are set up; V) the IP-BTS sends an access success indication to the BSC; VI) the BSC sends a TC switch link releasing request to the TC, and sends a wireless channel releasing request to the TDM-BTS while releasing its internal switch link.

According to a ninth aspect of the present invention, there is provided a method of call handover from IP-BTS to TDM-BTS for a mobile terminal by a base station system in a hybrid network. The method comprises the following steps: I) during the procedure of a call transmitted on the IP mode basis, a BSC will receive a call handover request triggered by an MSC or inside the BSC; in case of an MSC-triggered call handover request, upon receipt of the call handover request from the MSC, a TC transforms signaling No. 7 transmitted on the TDM mode basis into signaling No. 7 transmitted on the IP mode basis and subsequently forwards signaling No. 7 transmitted on the IP mode basis to the BSC; the flow then goes to step II); in case of a call handover request triggered inside the BSC, the flow directly goes to step II); II) upon receipt of an internal or external call handover request, the BSC allocates wireless resources, checks a call type, determines the mobile terminal to be located at the IP-BTS, sends a TC switch link setup request to the TC while setting up an internal switch link, and subsequently sends a wireless channel allocation request to the TDM-BTS; III) the TDM-BTS sends a voice channel connection setup request to the TC; IV) the system's voice channel for TDM mode-based transmission is activated, whereby an uplink and a downlink are set up; V) the TDM-BTS sends an access success indication to the BSC; VI) the BSC sends a wireless channel releasing request to the IP-BTS, and the BTS sends a switch link releasing request to the TC.

According to a tenth aspect of the present invention, there is provided a method of call releasing by a base station system in a hybrid network during TDM mode-based transmission. The method comprises the following steps: upon receipt of a call releasing request from an MSC, a TC transforms signaling No. 7 transmitted on the TDM mode basis into signaling No. 7 transmitted on the IP mode basis and subsequently forwards signaling No. 7 transmitted on the IP mode basis to a BSC; upon receipt of a call releasing request from the TC, the BSC sends a wireless channel releasing request to a TDM-BTS and a TC switch link releasing request to the TC and releases a switch link inside itself; a voice channel for TDM mode-based transmission is released.

According to an eleventh aspect of the present invent ion, there is provided a method of call releasing by a base station system in a hybrid network during IP mode-based transmission. The method comprises the following steps: upon receipt of a call releasing request from an MSC, a TC transforms signaling No. 7 transmitted on the TDM mode basis into signaling No. 7 transmitted on the IP mode basis and subsequently forwards signaling No. 7 transmitted on the IP mode basis to a BSC; upon receipt of a call releasing request from the TC, the BSC sends a wireless channel releasing request to an IP-BTS; the IP-BTS sends a TC switch link releasing request to the TC; a voice channel for IP mode-based transmission is released.

With the technical solution described above, the present invention has such advantages: compatibility with TDM, which maximumly protects the providers' investment; smooth transition from TDM to IP, which decreases investing risk; flexible choice for different physical layer or data layer transmission apparatuses to bear IP messages, which facilitates the providers to constitute their networks. In IP mode, data service can share bandwidth with mute frames which exist in a large number in voice service (the priority of data service is lower than that of voice service in order to guarantee the voice quality), and the system can coexist with different IP networks such as 3G or WiMax (worldwide microwave access operability). The BSC can be simplified as a signaling server in a pure IP mode network. And the control plane and the user plane are completely independent of each other so as to simplify the development procedure and reduce the maintenance cost.

BRIEF DESCRIPTION ON THE DRAWINGS

DESCRIPTION OF THE PREFERRED EMBODIMENTS

Figure 1:
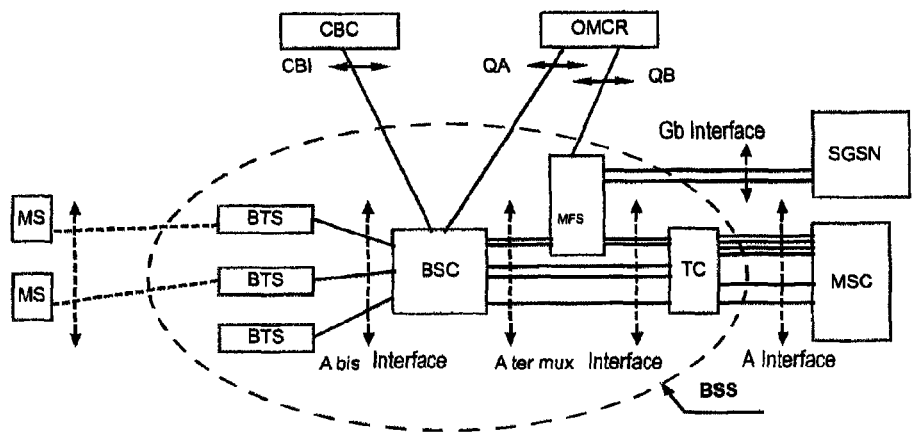
FIG. 1 is a schematic layout view of a traditional BBS.
Figure 2:
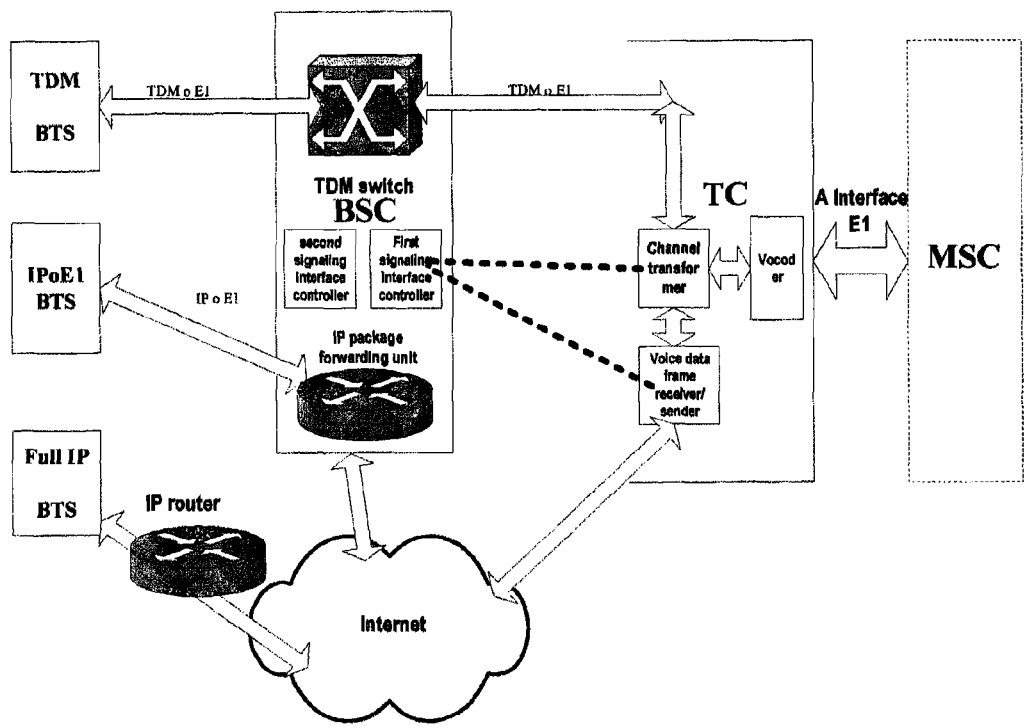
FIG. 2 is a schematic layout view of a base station system in a hybrid network of the present invention.

As shown in FIG. 2, the present invention, namely a base station system in a hybrid network, comprises a BSC, a TC connected with the BSC, several BTSs, and further comprises a bandwidth guaranteed IP network which is provided among the BSC, TC and BTSs. Both IP mode transmission and traditional TDM mode transmission between the BSC and the TC are supported in the system, and the BTSs can be either BTSs supporting TDM transmission or BTSs supporting IP transmission. A detailed description will be given below to the BSC, TC and BTS, respectively.

I. Base Station Controller (BSC)

Figure 9:
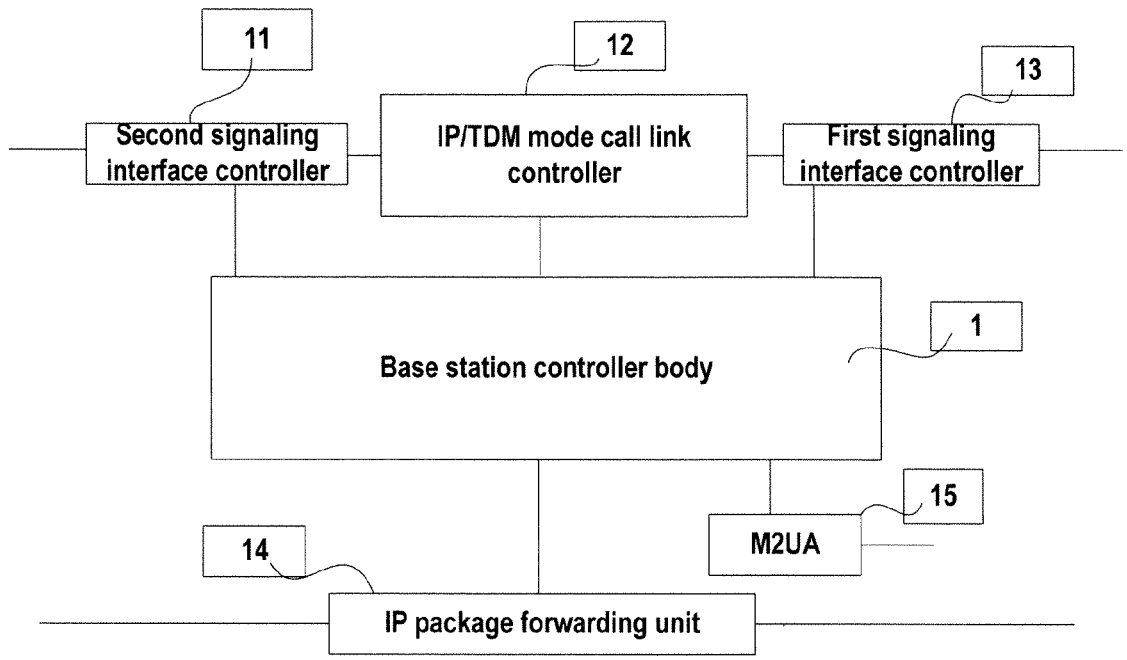
FIG. 9 is a schematic layout view of a base station controller of the present invention.

As shown in FIG. 9, a base station controller (BSC) is connected between several BTSs and a TC under TDM mode, IP/TDM hybrid mode and IP mode, respectively, which comprises an IP/TDM mode call link controller 12 based on a base station controller body 1, a first signaling interface controller 13 and a second signaling interface controller 11 each being connected with IP/TDM mode call link controller 12, and an IP package forwarding unit 14.

In a breakdown, IP/TDM mode call link controller 12 is used for processing setup, handover and releasing of voice and data call links during IP transmission or IP/TDM hybrid transmission;

First signaling interface controller 13 is used for processing signaling transmission with the TC, controlling setup and releasing of switch links between voice channels at Ater interfaces and voice channels at A interfaces inside the TC;

Second signaling interface controller 11 is used for processing signaling and voice transmission with the BTSs in IP, TDM or IP/TDM hybrid mode, and controlling setup and releasing of voice channels between the BTSs and the TC in IP mode or IP/TDM hybrid mode;

IP package forwarding unit 14 is responsible for forwarding IP packages.

Further, the base station controller can comprise an M2UA 15 (MTP2 user adaptive layer) located inside a signaling No. 7 link controller of base station controller body 1 and for supporting full IP transmission within the system and assuming signaling access of SS7 between the BSC and the TC.

II. Transcoder (TC)

Figure 10:
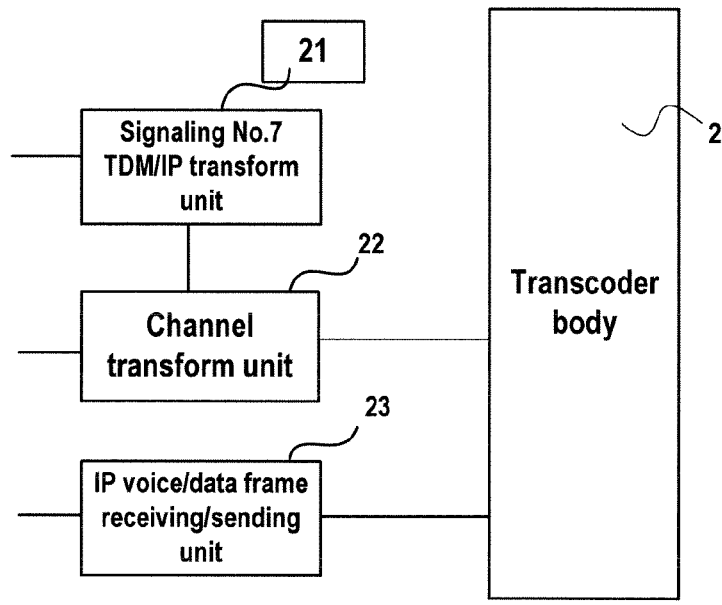
FIG. 10 is a schematic layout view of a transcoder of the present invention.

Referring to FIG. 10, a transcoder (TC) comprises a channel transform unit 22 and an IP voice/data frame receiving/sending unit 23 based on a transcoder body 2, as well as a signaling No. 7 TDM/IP transform unit 21 connected with channel transform unit 22.

In a breakdown, channel transform unit 22 is used for accepting control signals from first signaling interface controller 13 of the base station controller and processing link switch between various channels at A interfaces and Ater interfaces under IP, TDM or IP/TDM mode;

IP voice/data frame receiving/sending unit 23 is used for accepting control signals from first signaling interface controller 13 of the base station controller and packing, unpacking, receiving and sending of voice frames under IP transmission mode between the TC and the BTSs;

Signaling No. 7 TDM/IP transform unit 21 is used for processing the switch of signaling No. 7 between TDM transmission mode and IP transmission mode.

III. Base Transceiver Station (BTS) Supporting IP Transmission

Figure 11A:
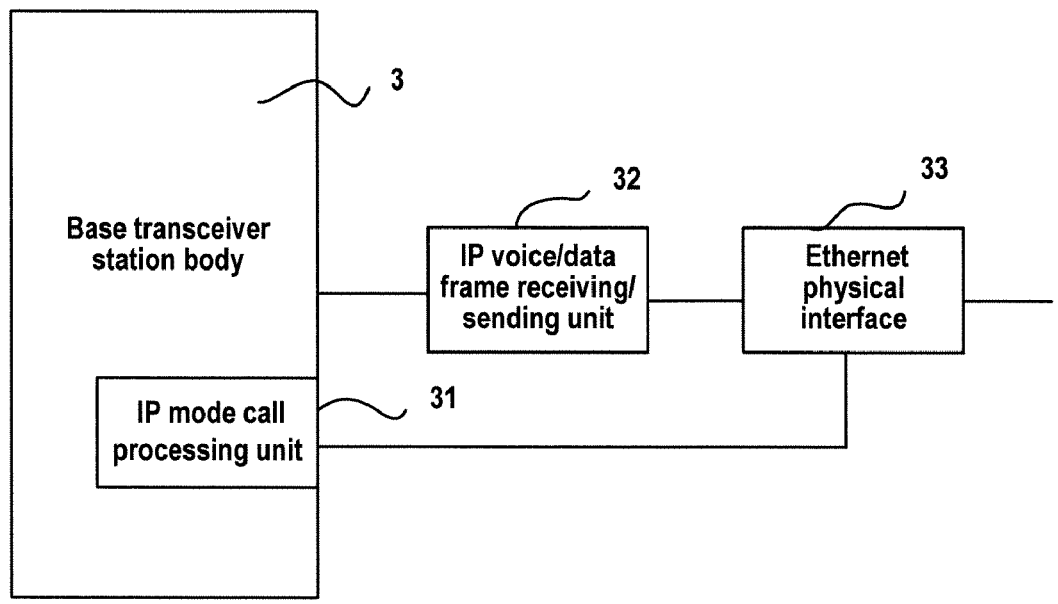
FIG. 11(a) is a schematic layout view of a base transceiver station of the present invention.

As shown in FIG. 11(a), a BTS which supports IP transmission comprises a BTS body 3, an IP mode call processing unit 31 based on BTS body 3, an IP voice/data frame receiving/sending unit 32, as well as an Ethernet physical interface 33 connected with both IP voice/data frame receiving/sending unit 32 and IP mode call processing unit 31.

In a breakdown, IP mode call processing unit 31 is used for processing setup, handover and releasing of voice call links, under the control of second signaling interface controller 11 of the BSC;

IP voice/data frame receiving/sending unit 32 is used for packing, unpacking, receiving and sending of voice frames in IP transmission mode between the TC and the present BTS.

Figure 11B:
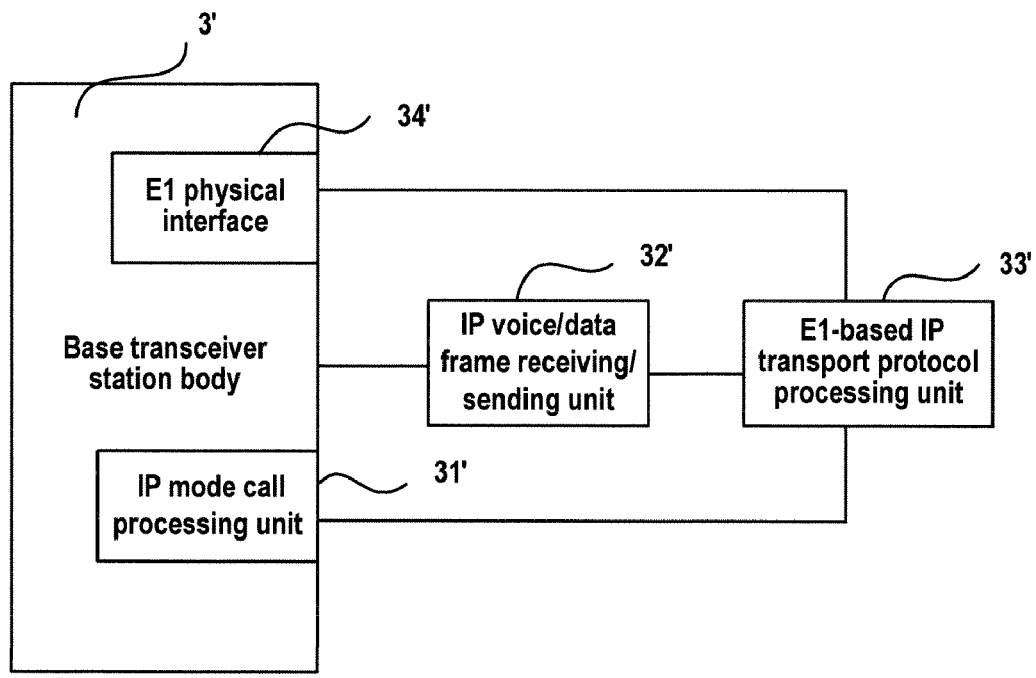
FIG. 11(b) is another schematic layout view of a base transceiver station of the present invention.

As shown in FIG. 11(b), a base transceiver station which supports IP transmission comprises a BTS body 3', an IP mode call processing unit 31' based on BTS body 3', an IP voice/data frame receiving/sending unit 32', as well as an EI-based IP transport protocol processing unit 33' connected with each of IP voice/data frame receiving/sending unit 32', IP mode call processing unit 31' and an E1 physical interface 34' on BTS body 3'.

In a breakdown, IP mode call processing unit 31' is used for processing setup, handover and releasing of voice call links, under the control of second signaling interface controller 11 of the BSC;

IP voice/data frame receiving/sending unit 32' is used for packing, unpacking, receiving and sending of voice frames in IP transmission mode between the TC and the present BTS;

E1-based IP transport protocol processing unit 33' is used for transmitting IP packages between the BTS and the BSC where E1 serves as a physical transmission medium.

In order to solve the problem concerning IP network-based signaling transmission for an Abis interface, the above-described base station system in a hybrid network employs a method of carrying a Lapd (D channel link access) protocol on UDP, thereby achieving both real-time performance and reliability of signaling transmission between the BSC and the BTS. The Abis interface protocol layer is as shown in the following table:

|      |
| ---- |
| Lapd |
| UDP  |
| IP   |

In order to solve the problem concerning signaling No. 7 transmission between the TC and the BSC, the system employs an M2UA approach, thereby achieving reliable transmission of signaling No. 7 between the TC and the BSC over IP. The IP-based signaling No. 7 transport protocol layer between the TC and the BSC is as shown in the following table:

|      |
| ---- |
| M2UA |
| SCTP |
| IP   |

To set up traditional TDM transmission at Atermux (a connect between the BSC and the TC) in a hybrid network, the system employs the existing TCSL protocol, thereby controlling setup and releasing of switch links between A and Atermux on the TC by the BSC and enabling the system to support the traditional TDM mode on Atermux. The IP-based switch link control protocol layer between the TC and the BSC is as shown in the following table:

|      |
| ---- |
| TCSL |
| SCTP |
| IP   |

To solve the problem concerning IP-based user plane transmission between the TC and the BTC, the system employs an existing method of carrying the TRAUP protocol on UDP, thereby achieving reliable transmission over IP at the user plane between the TC and the BTS. The IP-based user plane protocol layer between the TC and the BTS is as shown in the following table:

|       |
| ----- |
| TRAUP |
| UDP   |
| IP    |

Figure 3:
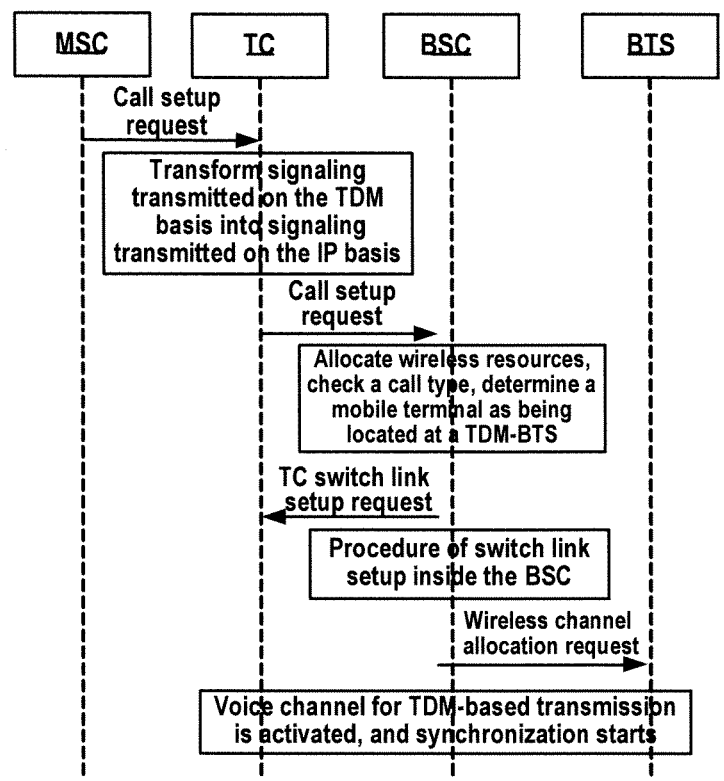
FIG. 3 is a processing flowchart of call setup during TDM mode-based transmission, which is implemented by a base station system in a hybrid network of the present invention.

As shown in FIG. 3, a method of call setup during TDM mode-based transmission, which is implemented by the inventive base station system in a hybrid network, comprises the following steps:

Upon receipt of a call setup request from the MSC, the TC transforms signaling No. 7 transmitted on the TDM mode basis into signaling No. 7 transmitted on the IP mode basis and subsequently forwards signaling No. 7 transmitted on the IP mode basis to the BSC;

Upon receipt of a call setup request from the TC, the BSC allocates wireless resources, checks a call type, determines the mobile terminal to be located at the TDM-BTS, sends to the TC a TC switch link setup request, sets up a switch link inside the BSC, and sends a wireless channel allocation request to the BTS;

The system's voice channel for TDM mode-based transmission is activated, whereby an uplink and a downlink are set up.

Figure 4:
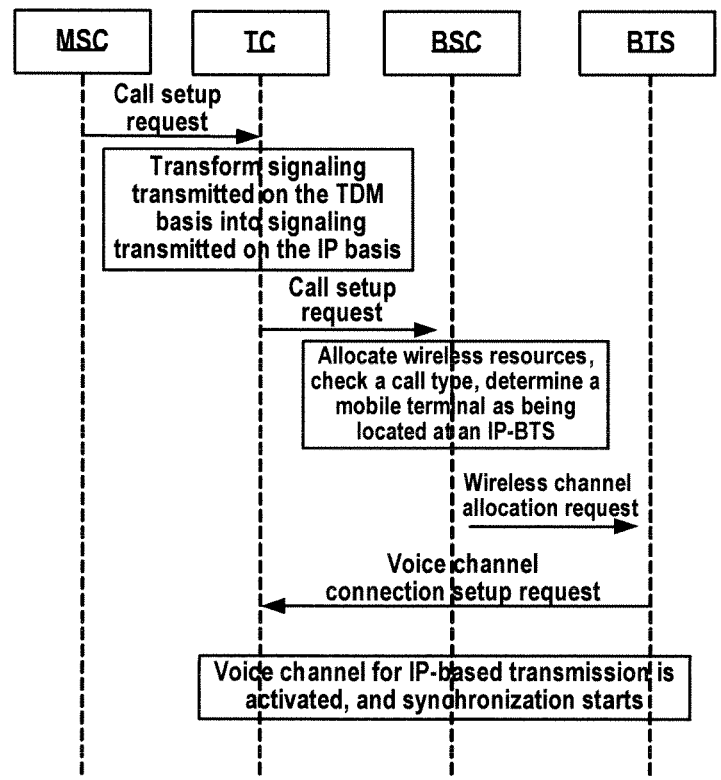
FIG. 4 is a processing flowchart of call setup during IP mode-based transmission, which is implemented by a base station system in a hybrid network of the present invention.

As shown in FIG. 4, a method of call setup during IP mode-based transmission, which is implemented by the inventive base station system in a hybrid network, comprises the following steps:

Upon receipt of a call setup request from the MSC, the TC transforms signaling No. 7 transmitted on the TDM mode basis into signaling No. 7 transmitted on the IP mode basis and subsequently forwards signaling No. 7 transmitted on the IP mode basis to the BSC;

Upon receipt of a call setup request from the TC, the BSC allocates wireless resources, checks a call type, determines the mobile terminal to be located at the IP-BTS, and sends a wireless channel allocation request to the BTS;

The BTS sends a voice channel connection setup request to the TC;

The system's voice channel for IP mode-based transmission is activated, whereby an uplink and a downlink are set up.

Figure 5A:
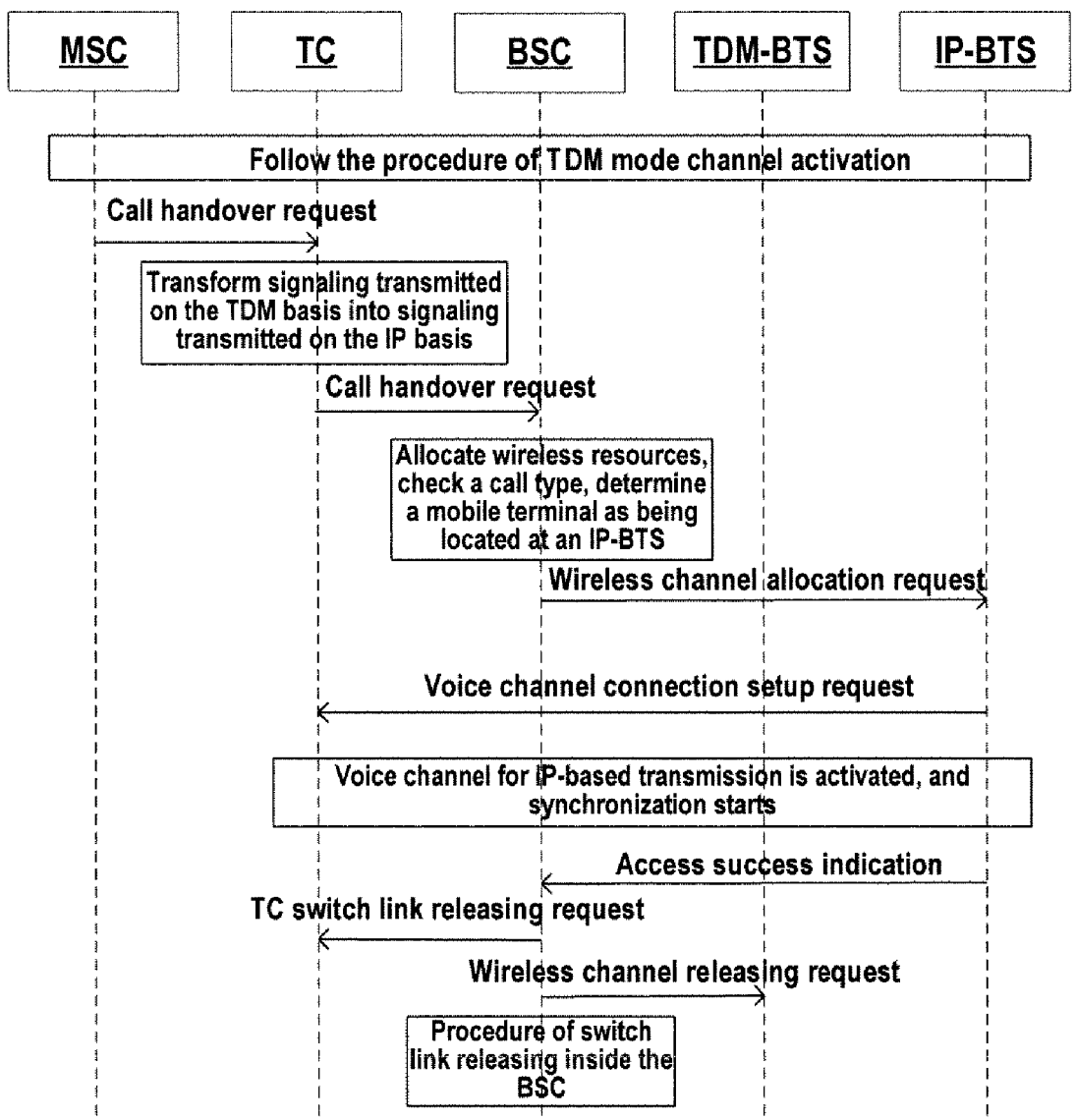
FIG. 5(a) is a flowchart of call handover (MSC-triggered call handover) from TDM-BTS to IP-BTS for a mobile terminal, which is implemented by a base station system in a hybrid network of the present invention.

As shown in FIG. 5(*a*), a method of call handover from TDM-BTS to IP-BTS for a mobile terminal, which is implemented by the inventive base station system in a hybrid network, comprises the following steps for an MSC-triggered call handover procedure:

During the procedure of a call transmitted on the TDM mode basis, the BSC will receive an MSC-triggered call handover request. Upon receipt of a call handover request from the MSC, the TC transforms signaling No. 7 transmitted on the TDM mode basis into signaling No. 7 transmitted on the IP mode basis and subsequently forwards signaling No. 7 transmitted on the IP mode basis to the BSC;

Upon receipt of a call handover request from the outside, the BSC allocates wireless resources, checks a call type, determines the mobile terminal to be located at the TDM-BTS, and sends a wireless channel allocation request to the IP-BTS;

The IP-BTS sends a voice channel connection setup request to the TC;

The system's voice channel for IP mode-based transmission is activated, whereby an uplink and a downlink are set up;

The IP-BTS sends an access success indication to the BSC;

The BSC sends a TC switch link releasing request to the TC, and sends a wireless channel releasing request to the TDM-BTS while releasing its internal switch link.

Figure 5B:
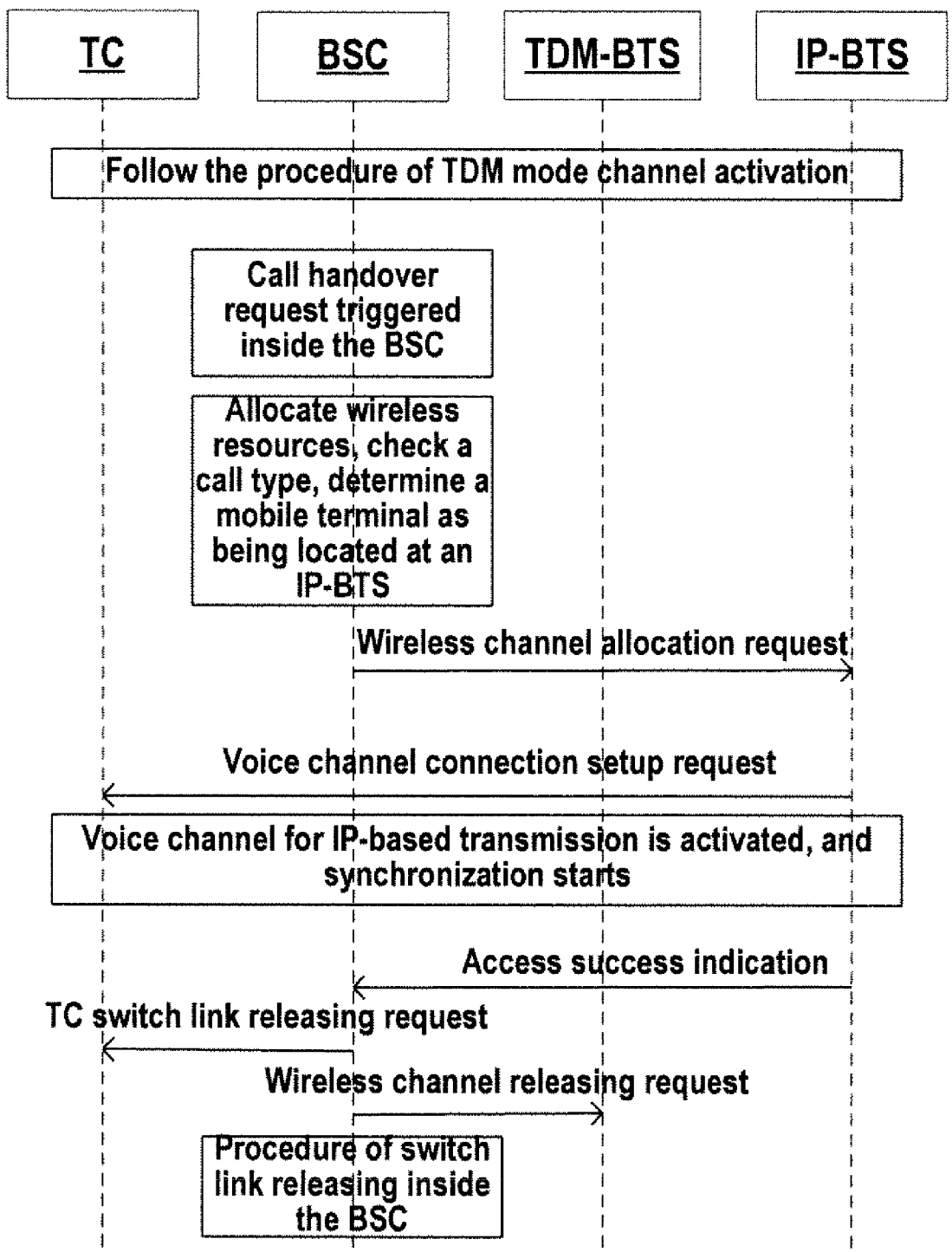
FIG. 5(b) is a flowchart of call handover (call handover triggered inside a BSC) from TDM-BTS to IP-BTS for a mobile terminal, which is implemented by a base station system in a hybrid network of the present invention.

As shown in FIG. 5(b), the following steps are comprised for the procedure of a call handover triggered inside the BSC:

During the procedure of a call transmitted on the TDM mode basis, upon receipt of a call handover request triggered inside the BSC, the BSC allocates wireless resources, checks a call type, determines the mobile terminal to be located at the TDM-BTS, and sends a wireless channel allocation request to the IP-BTS;

The IP-BTS sends a voice channel connection setup request to the TC;

The system's voice channel for IP mode-based transmission is activated, whereby an uplink and a downlink are set up;

The IP-BTS sends an access success indication to the BSC;

The BSC sends a TC switch link releasing request to the TC, and sends a wireless channel releasing request to the TDM-BTS while releasing its internal switch link.

Figure 6A:
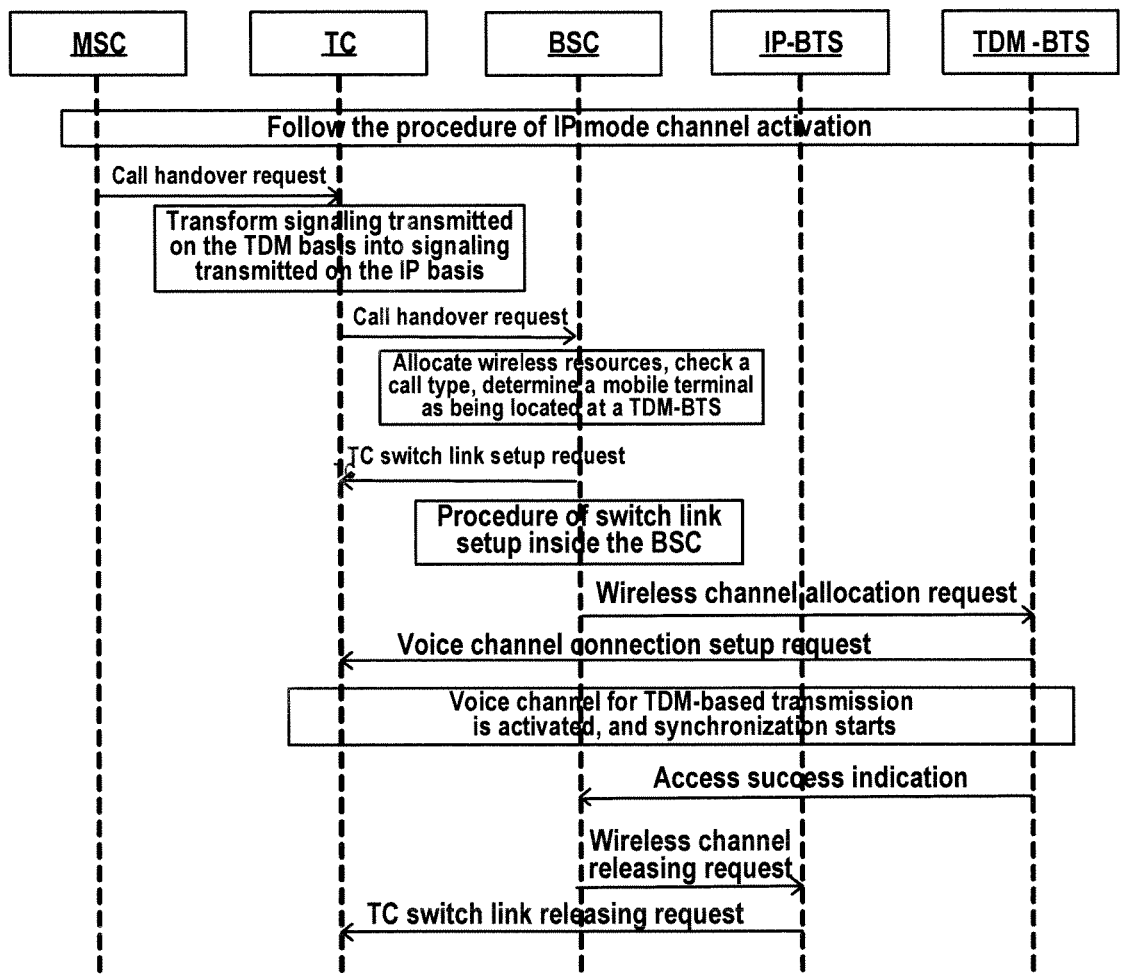
FIG. 6(a) is a flowchart of call handover (MSC-triggered call handover) from IP-BTS to TDM-BTS for a mobile terminal, which is implemented by a base station system in a hybrid network of the present invention.

As shown in FIG. 6(a), a method of call handover from IP-BTS to TDM-BTS for a mobile terminal, which is implemented by the inventive base station system in a hybrid network, comprises the following steps for an MSC-triggered call handover procedure:

During the procedure of a call transmitted on the IP mode basis, the BSC will receive an MSC-triggered call handover request. Upon receipt of a call handover request from the MSC, the TC transforms signaling No. 7 transmitted on the TDM mode basis into signaling No. 7 transmitted on the IP mode basis and subsequently forwards signaling No. 7 transmitted on the IP mode basis to the BSC;

Upon receipt of a call handover request from the outside, the BSC allocates wireless resources, checks a call type, determines the mobile terminal to be located at the IP-BTS, sends a TC switch link setup request to the TC while setting up an internal switch link, and subsequently sends a wireless channel allocation request to the TDM-BTS;

The TDM-BTS sends a voice channel connection setup request to the TC;

The system's voice channel for TDM mode-based transmission is activated, whereby an uplink and a downlink are set up;

The TDM-BTS sends an access success indication to the BSC;

The BSC sends a wireless channel releasing request to the IP-BTS, and the BTS sends a switch link releasing request to the TC.

Figure 6B:
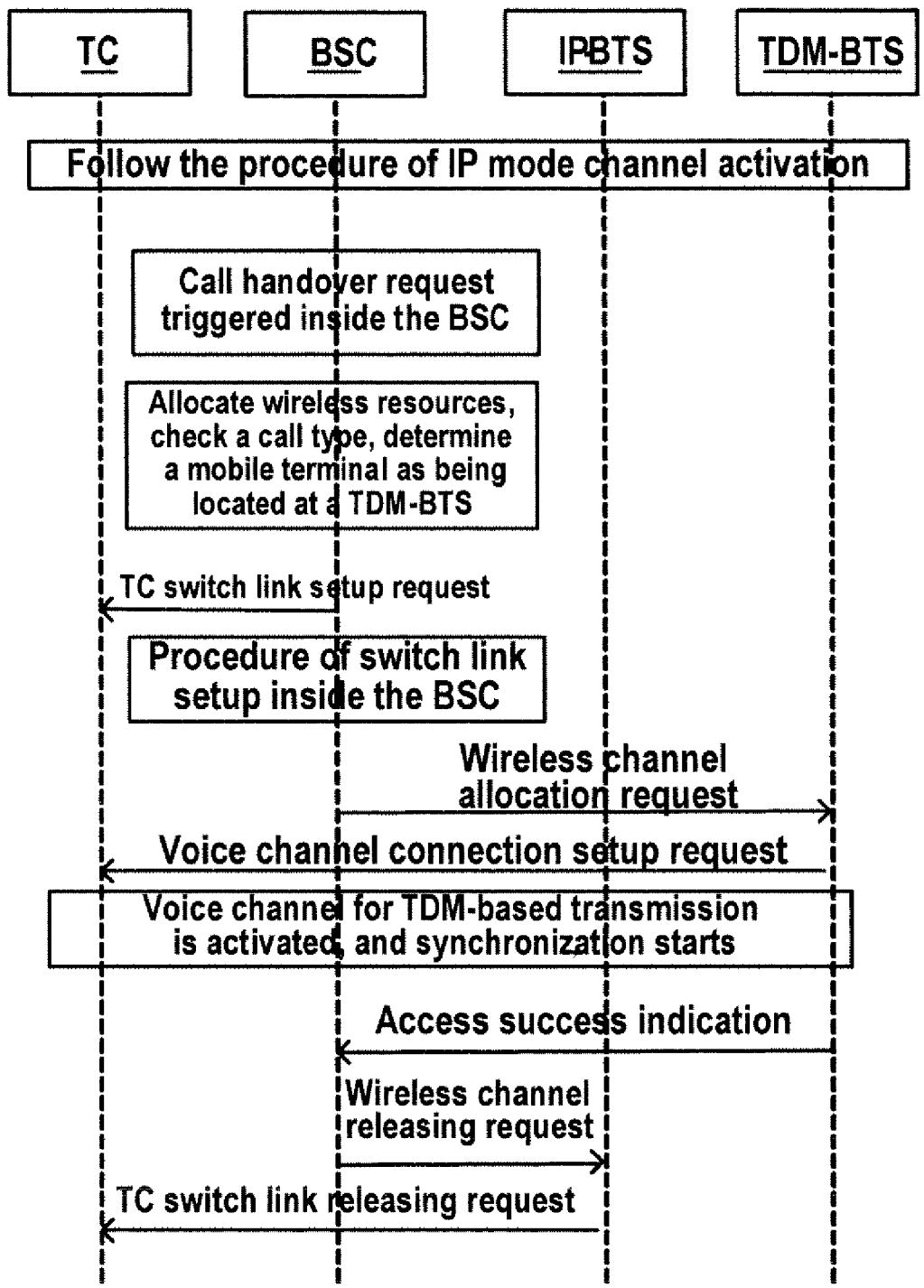
FIG. 6(b) is a flowchart of call handover (call handover triggered inside a BSC) from IP-BTS to TDM-BTS for a mobile terminal, which is implemented by a base station system in a hybrid network of the present invention.

As shown in FIG. 6(b), the following steps are comprised for the procedure of a call handover triggered inside the BSC:

During the procedure of a call transmitted on the IP mode basis, after a call handover request is triggered inside the BSC, the BSC allocates wireless resources, checks a call type, determines the mobile terminal to be located at the IP-BTS, and sends a TC switch link setup request to the TC while setting up an internal switch link, and subsequently sends a wireless channel allocation request to the TDM-BTS;

The TDM-BTS sends a voice channel connection setup request to the TC;

A voice channel for TDM mode-based transmission is activated, whereby an uplink and a downlink are set up;

The TDM-BTS sends an access success indication to the BSC;

The BSC sends a wireless channel releasing request to the IP-BTS, and the BTS sends a switch link releasing request to the TC.

Figure 7:
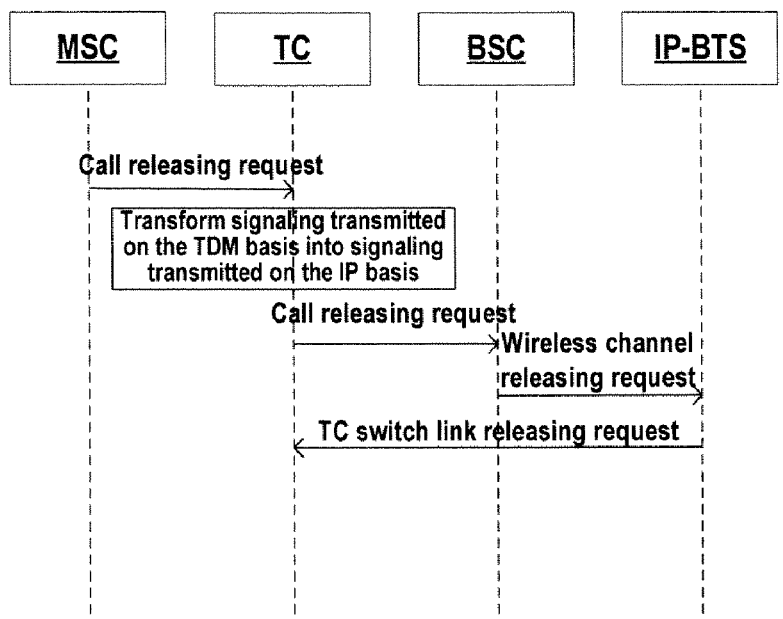
FIG. 7 is a processing flowchart of call releasing during TDM mode-based transmission, which is implemented by a base station system in a hybrid network of the present invention.

As shown in FIG. 7, a method of call releasing during TDM mode-based transmission, which is implemented by the inventive base station system in a hybrid network, comprises the following steps:

Upon receipt of a call releasing request from the MSC, the TC transforms signaling No. 7 transmitted on the TDM mode basis into signaling No. 7 transmitted on the IP mode basis and subsequently forwards signaling No. 7 transmitted on the IP mode basis to the BSC;

Upon receipt of a call releasing request from the TC, the BSC sends a wireless channel releasing request to the TDM-BTS and a TC switch link releasing request to the TC and releases a switch link inside itself;

The system's voice channel for TDM mode-based transmission is released.

Figure 8:
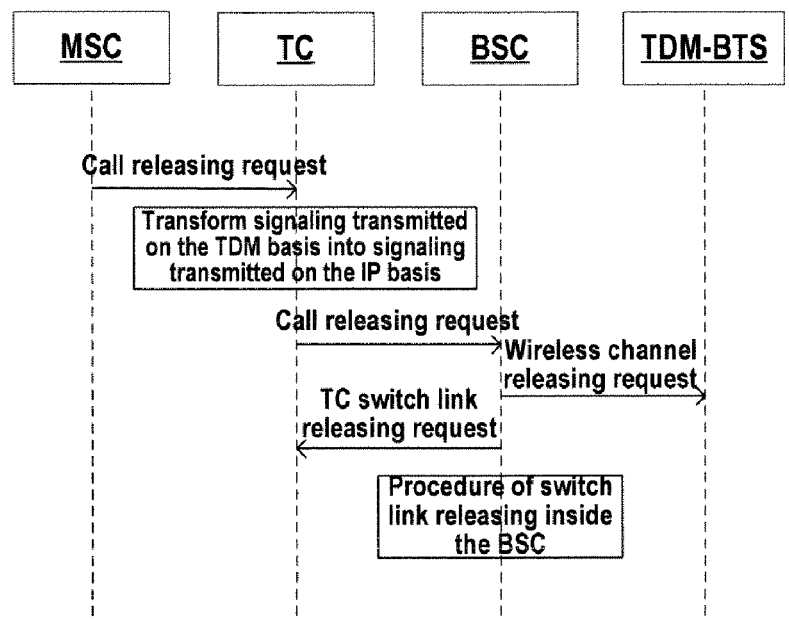
FIG. 8 is a processing flowchart of call releasing during IP mode-based transmission, which is implemented by a base station system in a hybrid network of the present invention.

As shown in FIG. 8, a method of call releasing during IP mode-based transmission, which is implemented by the inventive base station system in a hybrid network, comprises the following steps:

Upon receipt of a call releasing request from the MSC, the TC transforms signaling No. 7 transmitted on the TDM mode basis into signaling No. 7 transmitted on the IP mode basis and subsequently forwards signaling No. 7 transmitted on the IP mode basis to the BSC;

Upon receipt of a call releasing request from the TC, the BSC sends a wireless channel releasing request to the IP-BTS;

The IP-BTS sends a TC switch link releasing request to the TC;

The system's voice channel for IP mode-based transmission is released.

To sum up, fundamental ideas of the present invention comprise the following:

1. To protect the investment of providers, the impact on existing networks should be minimized. Since main devices and transmission resources are at Abis in BBS systems, this solution gives priority to the reduction of impact on Abis.

2. New networks should be compatible with prior TDM mode. BTSs and TC which operate in TDM mode and cannot be updated to IP mode (due to the memory, CPU and other restrictions) should be supported still.

3. For BTSs which need to be updated to IP mode, it is possible with IPoE1 that original E1 transmission links need no alteration. Providers can switch a mode of BTSs at any time (TDM->IP, IP->TDM).

4. New transmission mode (Ethernet, xDSL . . . ) interfaces are provided for new BTSs, thereby making full use of IP advantages.

5. For a connection between the BSC and the TC, the network supports both IP and traditional TDM mode, so that providers can protect original transmission resources to the greatest extent.

6. For a connection between the BSC and the TC, since it is close to the core network and needs a lower cost for transformation, it can be deemed in principle that a bandwidth guaranteed IP network can be provided between the BSC and the TC. Additionally, if providers wish to utilize original transmission networks and TC resources, traffic still can be carried over E1 in TDM mode. Since all signaling (SS7) will use IP mode, a new TC should provide an interface to the IP network.

It should be noted that the technical solution of the present invention has been presented for purposes of illustration only and not in a limiting sense. While the present invention has been described with reference to the embodiments, it is understood by those of ordinary skill in the art that modification or equivalent arrangements can be made to the present invention. The scope of the claims is to encompass any modifications or partial arrangements included within the spirit and scope of the present invention.

What is claimed is:

1. A base station controller (BSC), connected between several BTSs (Base Transceiver Station) and a TC (Transcoder) under TDM (Time Division Multiplexing) mode, IP/TDM hybrid mode and IP (Internet Protocol) mode, respectively, characterized by comprising an IP/TDM mode call link controller based on a base station controller body, a first signaling interface controller and a second signaling interface controller each being connected with the IP/TDM mode call link controller, and an IP package forwarding unit, wherein
- the IP/TDM mode call link controller is used for processing setup, handover and releasing of voice and data call links during IP transmission or IP/TDM hybrid transmission;
- the first signaling interface controller is used for processing signaling transmission with the TC, controlling setup and releasing of switch links between voice channels at Ater interfaces and voice channels at A interfaces inside the TC;
- the second signaling interface controller is used for processing signaling and voice transmission with the BTSs and in IP, TDM or IP/TDM hybrid mode, and controlling setup and releasing of voice channels between the BTSs and the TC in IP mode or IP/TDM hybrid mode;
- the IP package forwarding unit is responsible for forwarding IP packages.

2. The base station controller according to claim 1, characterized by further comprising an M2UA (MTP2 User Adaptive Layer) located inside a signaling No. 7 link controller of the base station controller body and for supporting full IP transmission within the system and assuming signaling access of SS7 between the BSC and the TC.

3. A controller according to claim 1, used in cooperation with a transcoder, the transcoder comprising a channel transform unit and an IP voice/data frame receiving/sending unit based on a transcoder body, as well as a signaling No. 7 TDM/IP transform unit connected with the channel transform unit, wherein
- the channel transform unit is used for accepting control signals from the first signaling interface controller of the base station controller and processing link switch between various channels at A interfaces and Ater interfaces under IP, TDM or IP/TDM mode;
- the IP voice/data frame receiving/sending unit is used for accepting control signals from the first signaling interface controller of the base station controller and packing, unpacking, receiving and sending of voice frames under IP transmission mode between the TC and the BTSs;
- the signaling No. 7 TDM/IP transform unit is used for processing the switch of signaling No. 7 between TDM transmission mode and IP transmission mode.

4. The base station system in a hybrid network according to claim 3, wherein the system further comprises a bandwidth guaranteed IP network provided among the BSC, TC and BTSs, and IP mode transmission and traditional TDM mode transmission between the BSC and the TC being simultaneously supported in the system, and wherein the BTSs are either BTSs supporting TDM transmission or BTSs supporting IP transmission.

5. The base station system in a hybrid network according to claim 4, characterized in that a TCSL protocol mode is employed for switch; link control signaling transmission between the TC and the BSC during IP mode transmission, to set up traditional TDM transmission at Ater interface in a hybrid network.

\* \* \* \* \*